Dec. 18, 1923.  
R. LUCKENBACH  
1,478,237  
COMPOSITION OF MATTER AND PROCESS OF USING THE SAME  
Filed April 22, 1919
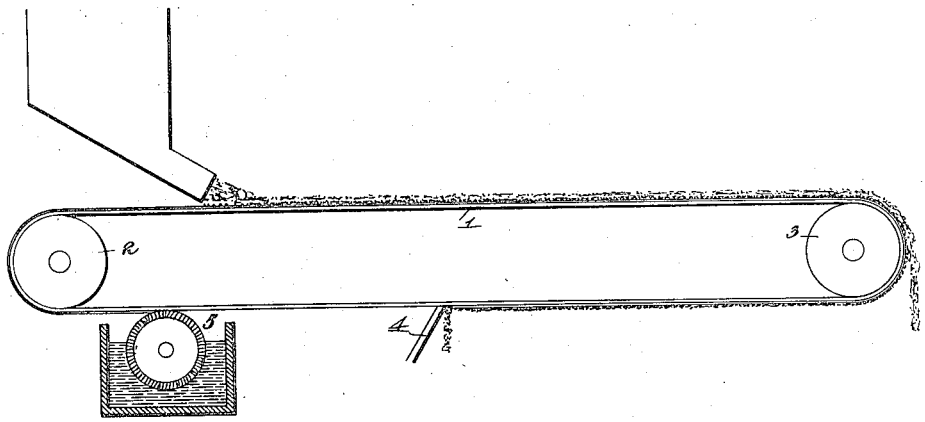
Witnesses  
Inventor  
Royer Luckenbach Patented Dec. 18, 1923.

1,478,237

UNITED STATES PATENT OFFICE.

ROYER LUCKENBACH, OF BROOKLYN, NEW YORK, ASSIGNOR TO LUCKENBACH PROCESSES, INC., OF SAN FRANCISCO, CALIFORNIA, A CORPORATION OF NEVADA.

COMPOSITION OF MATTER AND PROCESS OF USING THE SAME.

Application filed April 22, 1919. Serial No. 291,860.

*To all whom it may concern:*

Be it known that I, ROYER LUCKENBACH, a citizen of the United States, and a resident of the borough of Brooklyn, county of Kings, city and State of New York, have invented a certain new and useful Composition of Matter and Process of Using the Same, of which the following is a specification.

The invention herein disclosed relates to the concentration of ores by what may be termed the contact process, and wherein the ore, or mineral bearing earth in finely divided form is mixed with water to form a pulp and the pulp is directed to a surface composed of or coated with a material to which the mineral values will adhere and which will reject the earthy or rocky gangue.

The invention may be carried out in the concentration of various metallic minerals, as well as with certain non-metallic minerals, such as graphite and elemental sulphur, but is particularly applicable to working the gold and platinum bearing "black sand" of the Pacific coast of the United States and Canada. The black sand is generally found in the beds of streams and on the shores of the ocean, and may be utilized in the process without any previous treatment except to properly proportion the water to the sand. If desired the sand may be reduced to free the values prior to treatment in the process. When operating on lode ore the ore must be pulverized before it can be worked in the process.

The invention may be carried out in connection with a moving element, such as an endless belt or a cylinder, the surface of which is coated with the selective material of the invention. The pulp is directed to the coated surface on the upper side of the element in a thin stream. The values will adhere to the coating even when the surface is reversed but the valueless gangue and water will be discharged by gravity or by centrifugal force as the surface moves. The mineral bearing coating is removed from the element, a new coating is then applied, and the operation is repeated.

Instead of employing a moving element such as a belt or cylinder, a screen of loosely tangled material, such as excelsior, coated with the selective material, is provided and the pulp is passed through the screen. The values will adhere to the coating while the valueless gangue will pass through.

One object of the invention is to provide a process of ore concentration whereby the valuable mineral content of the ore is separated from the valueless rocky or earthy gangue, by the employment of a material having a strong preferential affinity for minerals in the free or virgin state, as well as certain chemical combinations thereof.

A further object is to produce a compound which will adhere tenaciously to the base to which it is applied and which will not only attract and become attached to certain materials, but will retain them against dislodgment by centrifugal force or by agitation.

Another object is to produce a composition which in addition to selecting mineral values will be strongly gangue repellent and water-proof, and which will prevent the values from being separated from the material, and the material from being separated from the element by washing.

These and further objects will more fully appear in the following specification, and accompanying drawings considered together or separately.

One embodiment of the invention is illustrated in the accompanying drawings in which the figure is a diagrammatic view of a Frue vanner in which the process may be carried out. It is to be understood that the invention is not limited to use in the type of apparatus shown, but may be used in any situation where the mineral bearing ore is directed to a surface or surfaces coated as described, and that the values may be recovered from the selective material in any desirable manner.

The invention may be carried out with all minerals and their chemical compounds which are subject to concentration by the oil flotation processes now in use, as well as with other mineral substances which will not be acted on by the materials employed in oil flotation.

In carrying out the invention a selective material comprising oil or grease, and an alkali is employed. The composition may be composed of petroleum grease, an animal fat or oil, and silicate of soda, or a mixture of the same and a solution of caustic soda. As an example, a satisfactory selective material for use in the process may be compounded of petroleum grease X X X, or caster machine oil, and silicate of soda, or a mixture of equal parts of silicate of soda and a solution of caustic soda.

The X X X or caster machine oil is petroleum treated with hog fat.

In making up the selective composition near turpentine is added to the X X X oil, the consistency of which is like that of vaseline, until the near-turpentine cuts the oil to the consistency of molasses. This mixture is then added to the petroleum grease, which normally is of the consistency of axle grease, until the mass becomes stringy, that is the mass is in such condition that when a portion of it is lifted as by a brush or stick the material will form a string between the surface of the mass and the removing means. Near-turpentine is a petroleum product from which the fat has been removed, and is employed because of its cheapness, but it is to be understood that any other hydrocarbon solvent may be used.

The mass just above described is a dark amber in color. Silicate of soda in liquid form, commonly known as "water glass," is now added until the color is changed to lemon yellow.

Instead of using silicate of soda in the mixture a mixture of silicate of soda and a caustic soda solution may be employed. When used the caustic soda may be in a saturated solution, or it may be considerably thinner.

In making the selective material up in quantities the following formula may be employed.

To 16 oz. of petroleum grease, add 8 oz. of a mixture of X X X oil and near-turpentine. To this mixture is added ½ oz. of the silicate of soda solution. If both caustic soda and silicate of soda are to be employed ½ oz. of silicate of soda solution is added to the oil mixture, and ½ oz. of caustic soda solution is added to the petroleum grease-oil-silicate mixture, or the caustic and silicate may be combined and added together.

An endless belt F for example, is coated with the above described mixture. An ore pulp comprising roughly three parts water to one part ore is directed to the coated surface in a thin stream and the belt is set in motion over pulleys 2 and 3. When the upper side of the belt reaches the pulley 3 toward which it travels, the water and gangue will be discharged by gravity but the mineral particles will adhere to the coating and be carried around the pulley. The coating with the adhering values is removed from the belt by a scraper 4. The belt is then recoated at 5 and the operation is repeated. The values may be released from the adhering material by any desired means.

Instead of adding the alkaline solution or solutions, as the case may be, to the selective material, either or both may be added to the water before the pulp is formed, or to the pulp, or both, but obviously more of the alkaline material will be required than if such material be employed in the selective mixture.

The process is particularly applicable in concentration of the alluvial sands of the Pacific coast some of which are particularly rich in gold, platinum and other rare minerals, and which have never been commercially worked to any great extent.

Silicate of soda and caustic soda are given as examples only, and it is to be understood that other alkalies, or metallic salts, or both, may be employed to alter the character of the selective material of the pulp.

Instead of employing a hydrocarbon for thinning the oil-grease mixture, the silicate of soda, or a mixture of the same and caustic soda may be used in quantity to produce the consistency desired.

In order that the selective mixture may have greater powers of adhesion, and be rendered more nearly water-proof, a resin such as liquefied rubber may be added thereto. The rubber is preferably dissolved in a hydrocarbon solvent, such as near-turpentine, and a suitable binder may be produced by dissolving rubber in the proportions of approximately 4 grams of rubber in about 1 pound of the solvent. It is to be understood that any other suitable rubber solvent may be employed in making the solution.

The rubber in the mixture will cause the same to adhere to the surface on which it is employed, and make the oil and grease water-proof. The selective material will not therefore be washed off by the water of the pulp, nor be scoured off by the gangue.

By the use of the rubber binder thinner oils and greases may be used, and those oils which are more or less miscible in water may be employed.

When used the liquefied rubber may be employed to thin the mixture of grease and oil instead of the solvent before mentioned.

In accordance with the provisions of the patent statutes I have described the principle of my invention, together with the apparatus which I now consider to represent the best embodiment thereof, but I desire to have it understood that the apparatus shown is merely illustrative, and that the invention may be carried out in other ways.

Having now described the invention what is claimed and desired to be secured by Letters Patent is—

1. A mineral selective composition for use in surface concentration of ores, comprising a mineral hydrocarbon, liquefied caoutchouc, and silicate of soda.

2. A mineral selective composition for use in surface concentration of ores, comprising petroleum grease, liquefied caoutchouc, and silicate of soda.

3. A mineral selective composition for use in surface concentration of ores, comprising a mineral hydrocarbon, an animal fat, liquefied caoutchouc, and silicate of soda.

4. A mineral selective composition for use in surface concentration of ores, comprising petroleum grease, an animal fat, liquefied caoutchouc, and silicate of soda.

5. A mineral selective composition for use in surface concentration of ores, comprising petroleum grease, an animal fat, liquefied caoutchouc, silicate of soda and caustic soda.

6. A process of concentrating ore, which consists in directing the ore in finely divided condition to a surface which comprises petroleum grease (asphalt base), an animal fat, liquefied caoutchouc, caustic soda, and silicate of soda.

7. A process of concentrating ore, which consists in directing an ore pulp to a surface comprising a mineral hydrocarbon, a resin, and silicate of soda.

8. A process of concentrating ore, which consists in directing an ore pulp to a surface comprising a mineral hydrocarbon, an animal fat, a resin, and silicate of soda.

9. A process of concentrating ore, which consists in directing an ore pulp to a surface comprising a mineral hydrocarbon, an animal fat, liquefied caoutchouc, and silicate of soda.

10. The process of concentrating ores, which consists in directing an ore pulp to a surface comprising petroleum grease and a mixture of animal oil and near turpentine to which is added a solution of silicate of soda and caustic soda.

This specification signed and witnessed this 12th day of April, 1919.

ROYER LUCKENBACH.

Witnesses:
CHARLES C. COLING,
A. E. RENTON.